US005383996A

United States Patent [19]

Dressler

[11] Patent Number: 5,383,996

[45] Date of Patent: Jan. 24, 1995

[54] METHOD AND WEB FOR APPLYING GRAPHICS TO FRAMING SUBSTRATE

[76] Inventor: Donald R. Dressler, 320 Cavan La., Glastonbury, Conn. 06033

[21] Appl. No.: 122,195

[22] Filed: Sep. 15, 1993

[51] Int. Cl.[6] .......... B32B 31/00; B32B 3/00; B44C 1/00

[52] U.S. Cl. .......... 156/234; 156/230; 156/235; 156/240; 156/265; 156/267; 156/290

[58] Field of Search .......... 156/230, 235, 248, 268, 156/241, 249, 265, 290, 234, 267

[56] References Cited

U.S. PATENT DOCUMENTS

| | | | |
|---|---|---|---|
| 2,238,073 | 4/1941 | Hill | 156/233 |
| 2,394,701 | 9/1941 | Laws | 156/235 X |
| 2,876,575 | 5/1959 | Leika | 156/289 X |
| 3,897,587 | 7/1975 | Molner | 428/409 X |
| 4,318,958 | 5/1982 | Smith | 156/235 X |
| 4,400,419 | 8/1983 | Laczynski | 428/40 X |
| 4,512,839 | 4/1985 | Gerber | 156/248 X |
| 4,604,153 | 8/1986 | Melbye | 156/235 |
| 4,673,609 | 7/1987 | Patten | 428/187 |
| 4,692,198 | 9/1987 | Gorreson | 156/235 X |
| 4,895,746 | 1/1990 | Mertens | 428/40 X |
| 4,994,131 | 2/1991 | Edwards | 156/241 X |
| 4,999,076 | 4/1991 | Incremona | 156/241 |
| 5,017,255 | 5/1991 | Calhoun | 156/230 X |
| 5,026,584 | 6/1991 | Logan | 156/234 X |
| 5,073,424 | 12/1991 | Dressler | 428/42 X |
| 5,078,670 | 1/1992 | Volkert | 156/248 X |
| 5,112,423 | 5/1992 | Liebe | 156/234 X |
| 5,240,539 | 8/1993 | Gunzelman | 156/248 X |

*Primary Examiner*—David A. Simmons
*Assistant Examiner*—Charles Rainwater
*Attorney, Agent, or Firm*—Chilton, Alix & Van Kirk

[57] ABSTRACT

A novel adhesive web or sheet having a carrier backing and an adhesive layer which can be cut with intricate graphic patterns and peeled to leave a reverse image of the desired graphic, as an adhesive on the carrier backing. The adhesive pattern is then transferred to the display or framing substrate, by the application of relatively low heat and pressure. After transfer, the adhesive pattern is right-reading, and serves as the bonding foundation for the ultimate graphic. A graphic sheet having a decorative upper surface, is placed with its lower surface on the adhesive pattern. Relatively low levels of heat and pressure are applied through the top, or decorative surface, thereby attaching the lower surface of the graphic sheet to the adhesive pattern, but not to the remainder of the framing substrate. After cooling, the graphic sheet is peeled away, leaving behind only that portion which bonded to the adhesive pattern. Thus, the observer sees the desired decorative graphic pattern with a raised surface consisting of a portion of the graphic sheet. Preferably, the carrier backing of the adhesive sheet is a transparent plastic, such as 500-700 gauge polyester film, on which a solution coated layer of adhesive including colorant has been applied. Preferably, the coated adhesive layer is a water-based dispersion of ethylene acrylic acid and urethane.

17 Claims, 8 Drawing Sheets

METHOD AND WEB FOR APPLYING GRAPHICS TO FRAMING SUBSTRATE

BACKGROUND OF THE INVENTION

The present invention relates to the general field of graphics, and more particularly, to the framing industry.

Techniques are well known for framing artwork, including paintings, photographs, certificates, posters, mementos, etc. Typically, the artwork is mounted on a solid sheet of heavy paper stock or its equivalent, e.g., card stock, mat board, velum, etc. Alternatively, an opening is cut in the paper, and the paper is then positioned over the artwork with the cut edges of the paper overlapping the boundary edges of the artwork. The framing process can be completed by optionally covering the paper and artwork with glass, and/or mounting the paper and artwork within a wooden or plastic outer frame.

Even when the item to be framed represents a noteworthy occasion, such as a wedding picture or invitation, a certificate, memento or the like, no cost effective technique exists for applying a high quality legend or other information such as the time, date, and place, or a significant phrase, to the framing substrate. Such a legend could be inked by hand, or stamped with a custom-made die, but these techniques, particularly the latter, are in most instances prohibitively expensive. Of course, inexpensive techniques such as screen printing or "rub-on" lettering could theoretically be used, but would usually degrade the overall appearance.

Thus, there exists no cost efficient technique for applying high quality lettering or legends to the framing material of the type used in the framing industry. Moreover, in view of this deficiency, it is doubtful that anyone in this industry would express optimism about the potential for applying complex graphic designs and the like to the framing materials, other than hand-painting by an artist.

Similar problems have also been present in the making of so-called "show signs". Such signs have been in long use in the lobbies of theatres, conference halls, and reception areas, to inform patrons or guests concerning the "main attraction". Because the information on the signs is typically event-specific, the cost of producing high quality characters or graphics, is generally prohibitive. Thus, such show signs are hand-lettered on paper or carry vinyl characters transferred on plastic, resulting in a functionality that may be satisfactory for information purposes, but which except at great expense, exhibits lower quality than that which the sponsors of the event wish to project.

SUMMARY OF THE INVENTION

It is, accordingly, an object of the present invention, to provide a method for applying high quality graphics on a display substrate or the like.

It is a more particular object of the invention, that the method be compatible with equipment that is presently commercially available to the retail framing and signage industries.

These objects are accomplished by the use of a novel adhesive web or sheet having a carrier backing and an adhesive layer which can be cut with intricate graphic patterns and peeled to leave a reverse image of the desired graphic, as an adhesive on the carrier backing. The adhesive pattern is then transferred to the display or framing substrate, by the application of relatively low heat and pressure. After transfer, the adhesive pattern is right-reading, and serves as the bonding foundation for the ultimate graphic. A graphic sheet having a decorative upper surface, is placed with its lower surface on the adhesive pattern. Relatively low levels of heat and pressure are applied through the top, or decorative surface, thereby attaching the lower surface of the graphic sheet to the adhesive pattern, but not to the remainder of the framing substrate. After cooling, the graphic sheet is peeled away, leaving behind only that portion which bonded to the adhesive pattern. Thus, the observer sees the desired decorative graphic pattern with a raised surface consisting of a portion of the graphic sheet.

It should be understood that a key aspect of the present invention is the capability of cutting custom graphics patterns in reverse, on the adhesive sheet. Equipment capable of performing the custom cutting is well known in the sign-making industry, for cutting vinyl or the like, to be transferred as sign characters to a sign substrate. With the present invention, however, characters or images are cut through an adhesive film or the like, for transfer as an adhesive pattern to the framing substrate.

Preferably, the carrier backing of the adhesive sheet is a clear, translucent or transparent plastic, such as 500–700 gauge polyester film, on which a solution coated layer of adhesive including colorant has been applied. Preferably, the coated adhesive layer is a water-based dispersion of ethylene acrylic acid and urethane. In the preferred embodiment, the graphic sheet is a hot stamping foil having an opaque, metalized, decorative upper surface and a lower surface having a high affinity for olefins.

The heating and pressurizing equipment is preferably of the type commonly used in the framing industry, for dry mounting a photograph, certificate, or similar artwork, to the framing substrate via an intervening layer of heat and pressure-activatable adhesive. The activation temperature with this equipment is typically less than 300° F. and more generally about 200° F., at a pressure of less than about 10 psi.

It should be appreciated that with the virtually unlimited graphics pattern cutting capabilities of modern computer controlled blades, the possibilities for applying graphics to the framing substrates, go far beyond mere lettering or other informative legends. The artistic talents of the operators of the retail framing business can be unleased such that, with the aid of the inherent flexibility and repeatability of the stored computer instructions, very ornate and/or illustrative graphics can be cost effectively achieved.

In a further advantage of the invention, several colors can be intermixed on the graphic pattern, achieving an even more impressive effect. This can readily be accomplished by placing strips or pieces of differently colored or decorated graphic sheets next to each other on the adhesive pattern, before applying heat and pressure.

In a similar manner, ornate graphics can be easily added to the borders of show signs and the like. Moreover, the information content of the show sign can also be presented as a decorative graphic using the technique of the present invention. Other advantageous uses of the invention include banners and personalized guest cards for weddings, barmizvahs, anniversaries, family reunions, and other occasions where guests are provided an opportunity to sign in. The card can have a custom graphic or logo that is especially suitable to the occasion.

BRIEF DESCRIPTION OF THE DRAWINGS

These and other objects and advantages of the invention will be evident from the following description of the preferred embodiment, made with reference to the accompanying figures, in which.

DESCRIPTION OF THE PREFERRED EMBODIMENT

Figure 1:
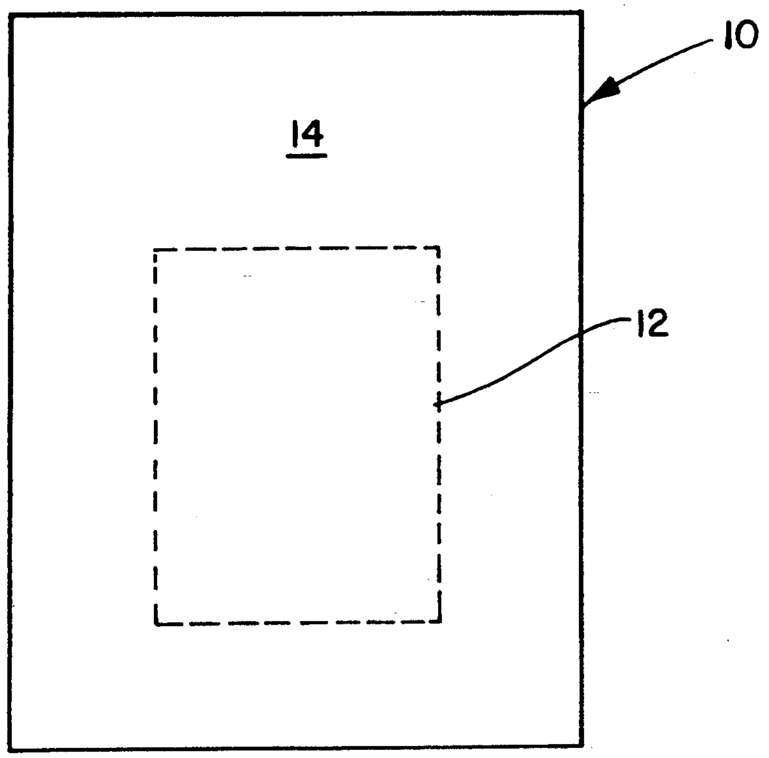
FIG. 1 is an illustration of a framing substrate, such as would be used for mounting an anniversary photograph or the like (shown in phantom)

FIG. 1 shows a framing substrate 10 which is in the form of a rectangular sheet of paper stock, such as card stock, mat board, vellum, or the like onto which, e.g., a photograph will be laminated within the phantom lines 12. Although typically the framing substrate would be a substantially homogeneous paper, it may also include an upper surface having color, texture, or a decorative pattern, as is well known in the field of art framing. It should be understood, however, that as used herein, the term "framing substrate", is more general, and includes other display substrates that are not normally associated with framing per se. These include substrates for show signs, guest registers, and the like. Although typically the substrate 10 is a form of paper, it may alternatively include plastic or composite material, e.g., spun olefins such as the Tyvek brand (a trademark of the DuPont Company). For purposes of the present invention, the framing substrate should be understood as the underlying stock material onto which a custom, raised graphic is to be applied, at an area 14, in accordance with the method described herein.

It is contemplated that in either a retail framing shop or retail sign making shop, a customer would select a particular framing substrate 10 and either select a graphic from a large variety of graphic templates maintained in a catalog in the shop, or give some degree of latitude to the shop proprietor, to create a custom or customized graphic. The inventory of templates and the artistic control available to the operator, derive from the commercial availability of computer-controlled machines for making transfer signs, such as the Graphics Advantage machine of the Gerber Scientific Company, Manchester, Conn. One such machine is described in U.S. Pat. Nos. 4,834,276 and 4,467,525, the disclosures of which are hereby incorporated by reference. These machines are designed to control the penetration and lateral movements of a blade through a relatively thin vinyl layer carried on a heavy substrate, such as release coated paper.

Figure 2A:
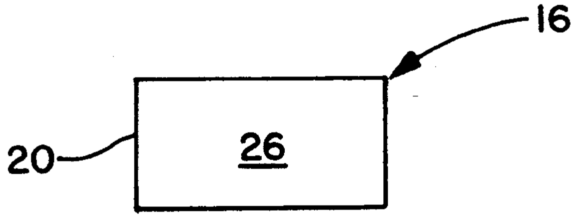
FIG. 2A is a plan view and FIG. 2B an enlarged sectional view of the adhesive sheet for applying a graphic on the framing substrate in accordance with the present invention.
Figure 2B:
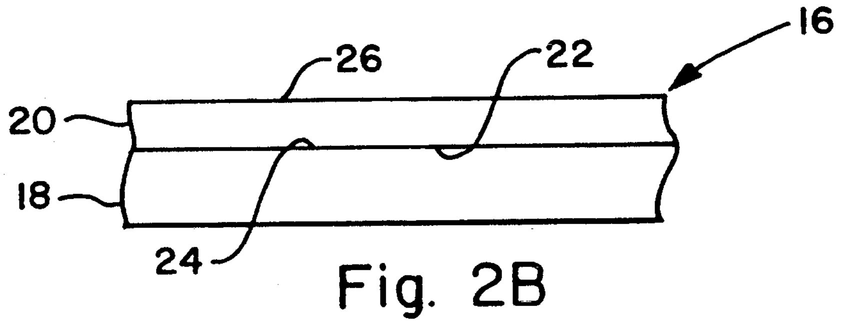

In the preferred embodiment of the present invention, a special adhesive sheet or web such as shown in FIGS. 2A, 2B is provided having structural properties which permit feeding and cutting in a sign making machine of the type mentioned above. However, rather than transferring cut graphics as sign characters to be applied to a sign substrate, the cut pattern of the present invention transfers an adhesive to the framing substrate.

The adhesive sheet 16 from which a pattern is cut, has a carrier backing 18, preferably transparent plastic, that is resistant to cutting by the blade of the cutting machine. The preferred material is 500–700 gauge clear polyester, but other materials could be used, for example, a polyester coated paper or other unitary structure which provides a plastic upper surface. An adhesive layer 20 is preferably coated directly on the carrier backing 18, i.e., without any intervening release coating or pressure sensitive adhesive. Preferably, the coating (when dry) has a thickness in the range of 1.5–4.0 mils, particularly 3.0 mils, which fills irregularities on the framing substrate during subsequent steps of the method.

A coating 20 containing ethylene acrylic acid and a thermoplastic material such as urethane has been found to be the most effective adhesive while optimizing the trade off between sufficient adhesion to backing 18, to facilitate the cutting of fine lines and thus narrow bands using the cutting machine, and peelability, so that the carrier backing 18 can eventually be removed from the adhesive layer 20 in a manner to be described more fully below.

In a particularly advantageous formulation of the adhesive layer 20, a water borne dispersion of urethane, such as is available under the name Sancure No. 2104 from the Sancure Corporation of Leomeister, Mass., is mixed with a water borne dispersion of ethylene acrylic acid such as is available as formulation Q-293 from the Mica Corporation of Stratford, Conn., the former representing 2–5% of the total weight of the mixed dispersions. A colorant, such as titanium dioxide and carbon black, representing about 2–3% of the total, is also provided to enable the user to readily distinguish between the carrier backing 18 and the adhesive layer 20. The balance is the ethylene acrylic acid dispersion, preferably including a suitable thickening agent to adjust viscosity. The Mica-293 dispersion is about 20% solids, and the Sancure No. 2104 is about 30% solids. As a result, the solids content of the dried coating are about 80–90% ethylene acrylic acid, 3–6% urethane, 5–7% colorant, and 5–10% thickener.

After the coating 20 has dried, while in direct contact with the polyester carrier 18, the peel value between the coating layer and the carrier is preferably in the range of about 3–10 ounces. In this context, the peel value of the coating can be determined by cutting two straight lines one inch apart on dried layer 20, and adhering thereto a one inch wide strip of pressure sensitive tape such as a 2.0 mil thick polyester tape available as type 2812 from Dielectric Polymers, Inc. of Holyoke, Mass.

The peel value is the force required to remove the cut strip of coating at the rate of 12 inches per minute as the polyester tape is pulled back at 180 degrees.

The formulation of the coated layer 20, results in relatively low tendency of the layer to adhere to itself when peeled. In other words, the peel value between the lower surface 22 of the coated layer 20 when dry and the upper surface 24 of the carrier 18, is greater than the peel value between any portions of the coated layer such as 22,26, which come into contact with each other. In this respect the meaning of the term "peel value" can be generalized to describe the force necessary to pull one film material away from another film material with which it is in contact. This meaning is similar to that used in U.S. Pat. Nos. 5,073,424 and 5,236,752, the disclosures of which are hereby incorporated by reference. The peel value relationship is a preferred feature which greatly facilitates the implementation of the invention by relatively unskilled operators.

The more important properties, however, are that the layer 20 accept fine line cutting of graphic patterns, and as will be described below, that it be activatable as a strong adhesive when in contact with the framing substrate and the graphics sheet, preferably at the low temperatures and pressures commonly used for conventional dry mounting equipment. One such machine is available as model No. 500T from the Seal Products Company; others are available under the general category of dry mount laminating presses.

Figure 3:
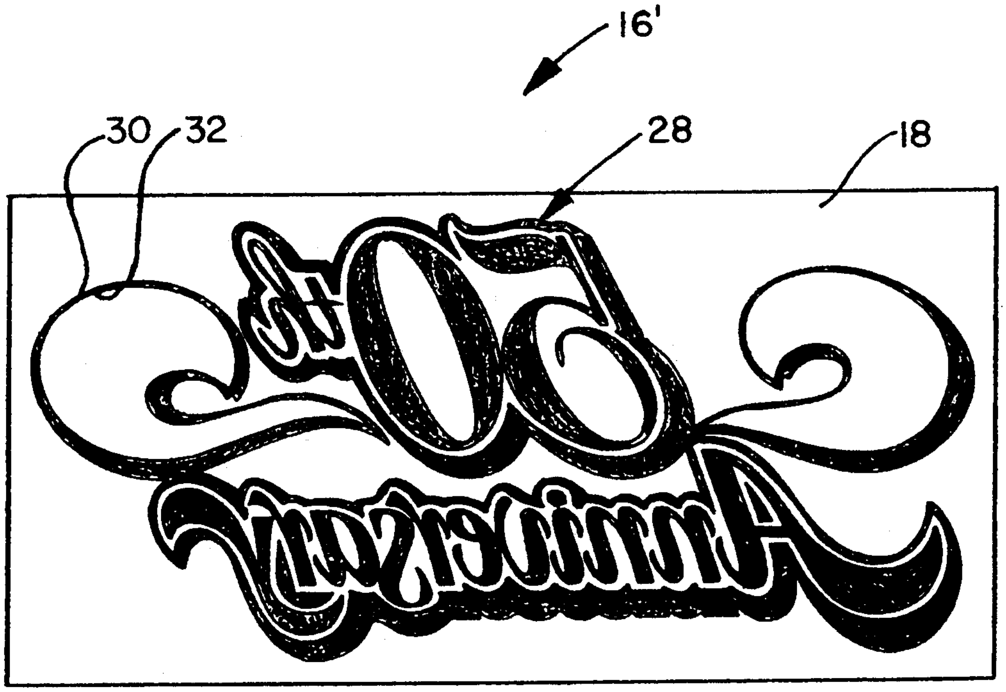
FIG. 3 shows the adhesive sheet of FIG. 2, after cutting and peeling of a reverse graphics pattern.

Turning now to FIG. 3, the adhesive sheet is shown as 16' after a graphic pattern 28 has been cut thereon in reverse, and the superfluous portions peeled away. The portion 28 remaining, can be considered an adhesive pattern that is a reverse image of the desired graphic. The peeled adhesive sheet 16' is turned up-side down so that the adhesive pattern 28 is placed at the desired location 14 on the framing paper (see FIG. 1). The light transmitting character of the carrier backing 18 facilitates this step. The framing substrate 10 with adhesive sheet, and any suitable pad or the like of a type conventionally used in dry mount lamination, are placed in the press and maintained for a first period of time at a first temperature and pressure, until the adhesive pattern 28 bonds to the framing substrate 10. The temperature and pressure are below 300° F. and 10 psi, respectively, and preferably, about 200° F. at 5 psi, for a duration of 30 to 60 seconds. It should be appreciated that these temperature and pressure conditions are far lower than the temperatures over 300° and pressures over 100 psi, that are used for hot stamping in connection with the conventional transfer printing of metalized and opaque foils. The adhesive pattern 28 does not fully melt, but rather maintains sharp edges.

Figure 4:
FIG. 4 shows the upper area of the framing substrate of FIG. 1, with the adhesive pattern of FIG. 3 transferred thereto by the application of heat and pressure.

After cooling and peeling away of the carrier backing 18, the adhesive pattern 28' is bonded to and slightly raised from the framing substrate 10, in right-reading orientation, as shown in FIG. 4.

Figure 5A:
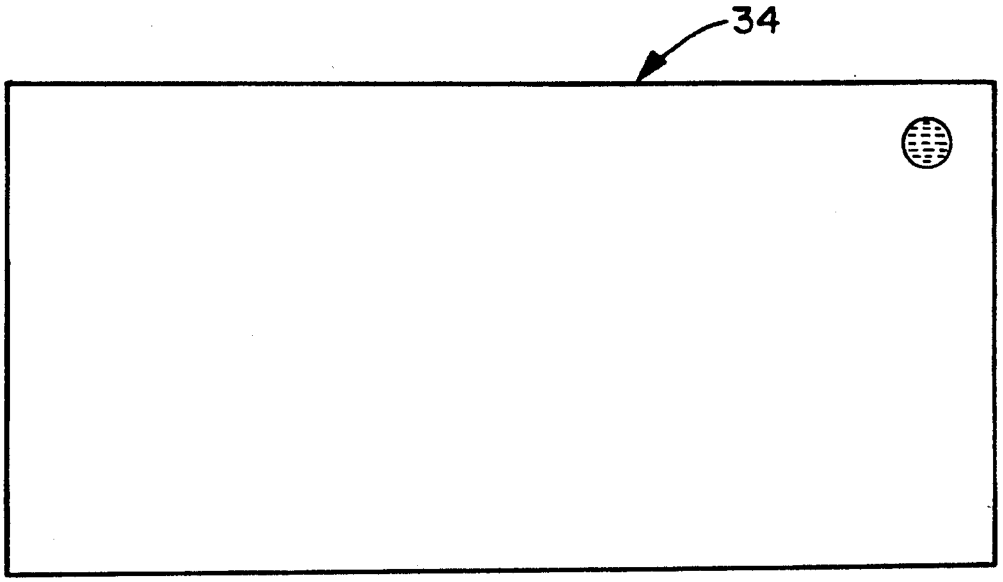
FIG. 5A is a plan view and FIG. 5B an enlarged section view of a decorative graphics sheet, such as stamping foil.
Figure 5B:
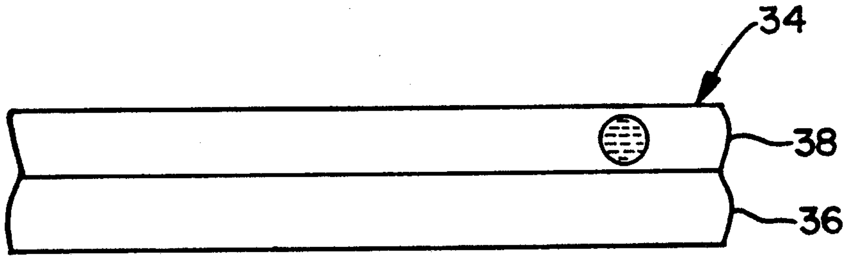
Figure 6:
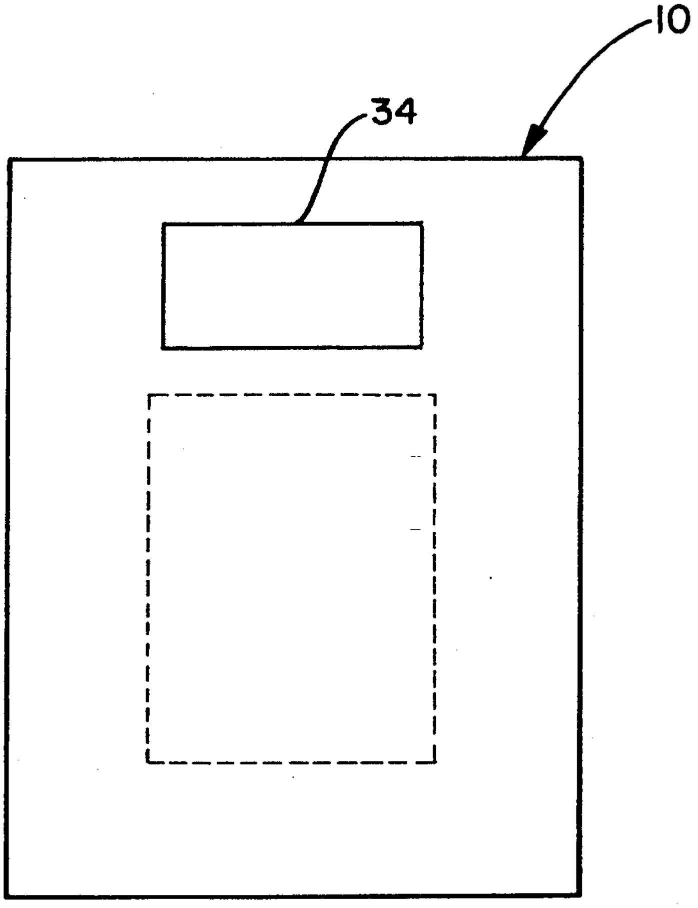
FIG. 6 is a plan view of the graphics sheet of FIG. 5A placed on the framing substrate with the adhesive pattern as shown in FIG. 4.

The framing substrate with bonded adhesive pattern is then overlaid with one or more graphic sheets 34, as shown in FIGS. 5 and 6. In particular, the lower side 36 of the graphic sheet 34 is placed directly on the adhesive pattern 28' so that the upper, decorative side 38 faces the operator. The preferred graphic sheet is a hot stamping foil of the type normally used for transfer printing, e.g., opaque, metalized foils such as the Luxor P Series from Kurz-Hastings Company, Philadelphia, Pa. The lower surface 36 of these foils is primed to facilitate bonding to various substrates, but is bondable to the adhesive pattern 28'. Other graphic sheets could alternatively be used, for example, Colorite brand colored material from Kurz-Hastings has a gloss or matte finish on its upper surface and lower surface primer of a type that will bond to the adhesive pattern 28' at low temperatures and pressures produced by the dry mounting press, e.g., below 300° and 10 psi.

Such press is used at 200° F. for two to three minutes at under 5 psi, but in any event below 300° F. and 10 psi. As is well known in the field of framing, a silicone sponge, for example having a 0.0625 inch thickness, can be used between the heating surface of the press and the foil 34, to help seal the foil on to the substrate, and/or to provide an appropriate texturing. Other well known texturing techniques can also be employed, e.g., use of textured paper for embossing.

It should also be understood that the primer on underside 36 of the decorative or graphic sheet 34 does not bond to the substrate 10 so that there is no inadvertent transfer of decorative material directly to the framing substrate. Only that portion of the decorative sheet which is directly in contact with the adhesive layer 28' is transferred thereto. The composition of the adhesive layer provides a bonding to the graphic sheet in contact therewith, in the preferred embodiment, by the affinity of the primer in the graphic sheet 34, to the adhesive layer 20, even at temperatures and pressures well below those associated with hot stamp printing. The preferred foils are of the type usually utilized for attachment to plastic surfaces, with relatively high activation temperature and pressure and clean "breakaway" characteristics suitable for stamping.

Figure 7:
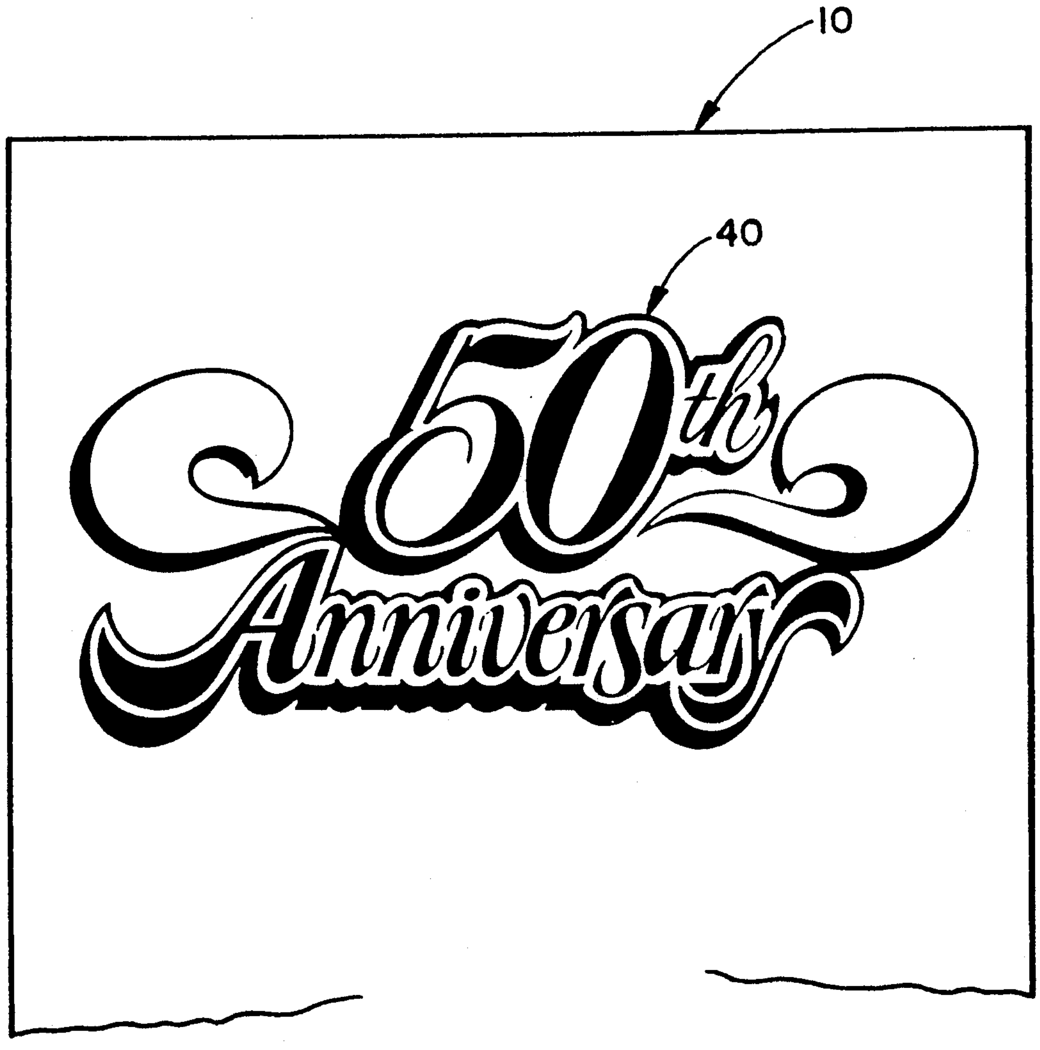
FIG. 7 is a plan view of the upper area of the framing substrate with the completed graphic thereon.

FIG. 7 shows the completed graphic 40, after the graphic sheet 34 has been pulled away from the substrate 10, leaving only fine-edged portions as raised, decorative surfaces bonded to the adhesive pattern 28'.

Figure 8:
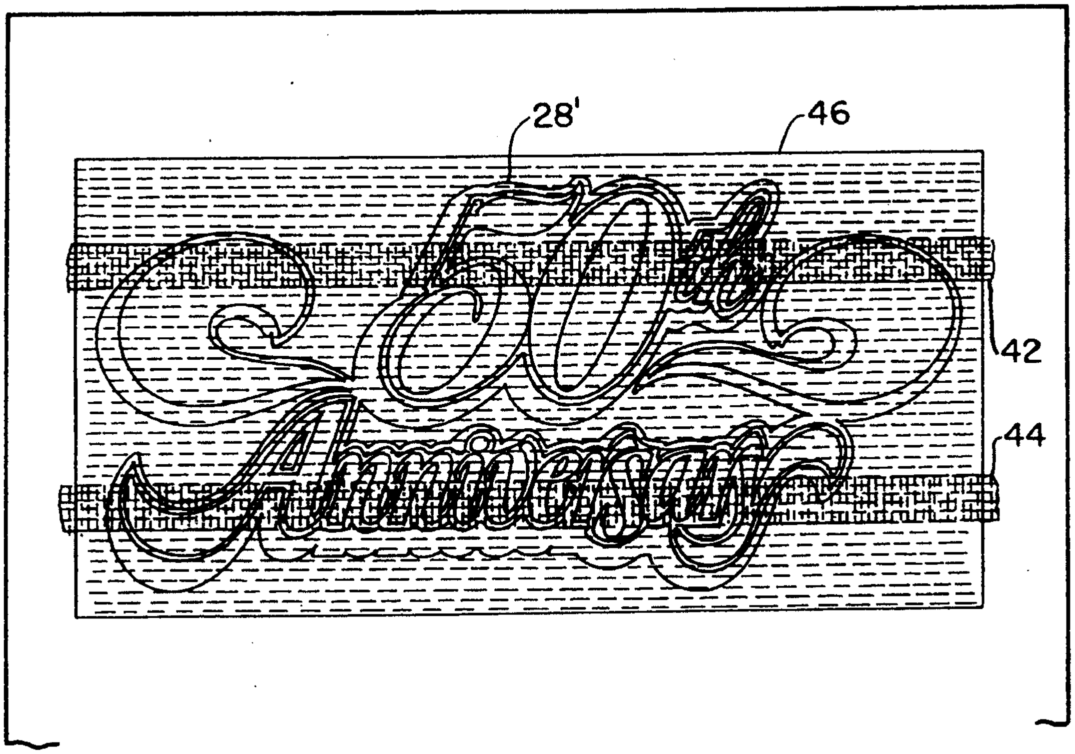
FIG. 8 is a view similar to FIG. 6, showing three differently colored graphic sheets placed on the adhesive pattern carried by the substrate as shown in FIG. 4.
Figure 9:
FIG. 9 shows the completed graphic corresponding to FIG. 8.

With reference now to FIGS. 8 and 9, it can be seen that multiple colors or textures can be achieved with the graphic, for example, by placing a plurality of differently colored graphic sheets 42,44,46, overlapping each other or side-by-side on the adhesive pattern 28'. These can overlap because the foils will not adhere to each other at the relatively low pressures and temperatures utilized with the present invention. Thus, only the portions of the foils which are in direct contact with the adhesive pattern will ultimately constitute the final graphic. In FIG. 8, foil strips 42,44 are below foil sheet 46. After the application of heat and pressure, cooling and removal, the final, multi color or multi texture graphic 48 is achieved as shown in FIG. 9.

The present method can be used to produce artistic, complex graphics ranging from thick, bold lines to very intricate, ornate lattice work. By using the cutting equipment mentioned above, adjacent cut lines such as 30,32 (FIG. 3) can be made within 0.10 or even 0.0125 inch of each other and successfully peeled away, i.e., leaving a thin deposit of adhesive material having a width on the order of 0.0125 inch, and virtually any curvature.

I claim:

1. A method for applying a graphic to a display substrate comprising:

selecting an adhesive sheet having a carrier backing and an adhesive layer;

cutting a pattern through the adhesive layer but not the backing of the adhesive sheet;

peeling some of the cut adhesive layer from the carrier backing while leaving the remainder on the carrier backing as an adhesive pattern that is a reverse image of the desired graphic;

placing the adhesive sheet so that the reverse image adhesive pattern contacts the display substrate;

applying heat and pressure to the carrier backing for a first period of time, thereby bonding the reverse image adhesive pattern to the display substrate;

after said first period of time, peeling the carrier backing away from the adhesive pattern, which remains bonded to the display substrate such that the adhesive pattern appears right-reading with respect to the desired graphic;

selecting a graphics sheet having a lower side and an upper, decorative side;

placing the graphics sheet on the display substrate, with said lower side in contact with said right-reading adhesive pattern;

applying heat and pressure to the graphics sheet for a second period of time, thereby bonding the graphics sheet only to the right-reading adhesive pattern;

after said second period of time, pulling the graphics sheet from the display substrate, thereby leaving a portion of the graphics sheet bonded to the right-reading adhesive pattern and constituting the desired graphic on said display substrate.

2. The method of claim 1, wherein the step of cutting includes controlling a blade by a computer to cut one of a plurality of pre-programmed reverse image patterns through the adhesive layer of the adhesive sheet.

3. The method of claim 2, wherein the adhesive layer releasably adheres to the carrier backing with a peel value in the range of about 3–10 ounces, and the step of cutting includes making adjacent cut lines that are within 0.10 inch of each other.

4. The method of claim 2, wherein the step of cutting includes making adjacent cut lines that are between about 0.0125 and 0.10 inch of each other.

5. The method of claim 3, wherein the peel value of the adhesive layer to itself, is less than the peel value of the adhesive layer to the carrier backing.

6. The method of claim 1, wherein the adhesive sheet consists of a unitary, light-transmitting carrier backing and a colored adhesive layer including ethylene acrylic acid and thermoplastic material.

7. The method of claim 1, wherein said heat is applied at a temperature of less than about 300 degrees F.

8. A method for applying graphics on framing paper, comprising:

selecting an adhesive sheet having a carrier backing and an adhesive layer;

cutting a pattern through the adhesive layer of the adhesive sheet;

peeling some of the cut adhesive layer from the carrier backing while leaving the remainder on the carrier backing as an adhesive pattern that is a reverse image of the desired graphic;

placing the adhesive sheet so that the reverse image adhesive pattern contacts the framing paper;

applying heat and pressure to the carrier backing for a first period of time, thereby bonding the reverse image adhesive pattern to the framing paper;

after said first period of time, peeling the carrier backing away from the adhesive pattern, which remains bonded to the framing paper such that the adhesive pattern appears right-reading with respect to the desired graphic;

selecting a graphics sheet having a lower side and an upper, decorative side;

placing the graphics sheet on the framing paper, with said lower side in contact with said right-reading adhesive pattern;

applying heat and pressure to the graphics sheet for a second period of time, thereby bonding the graphics sheet only to the right-reading adhesive pattern;

after said second period of time, pulling the graphics sheet from the framing paper, thereby leaving a portion of the graphics sheet bonded to the right-reading adhesive pattern and constituting the desired graphic on said framing paper.

9. The method of claim 8, wherein the step of cutting includes controlling a blade by a computer to cut one of a plurality of pre-programmed reverse image patterns through the adhesive layer of the adhesive sheet.

10. The method of claim 9, wherein the adhesive layer releasably adheres to the carrier backing with a peel value in the range of about 3–10 ounces, and the step of cutting includes making adjacent cut lines that are within the range of 0.10 to 0.0125 inches of each other.

11. The method of claim 8, wherein the peel value of the adhesive layer to itself, is less than the peel value of the adhesive layer to the carrier backing.

12. The method of claim 8, wherein the adhesive sheet consists of light transmitting plastic carrier backing and a colored adhesive layer containing ethylene acrylic acid and a thermoplastic material.

13. The method of claim 12, wherein the thermoplastic material is urethane.

14. The method of claim 9, wherein the adhesive layer is a coating on the carrier backing, consisting essentially of a dried water based dispersion of urethane, ethylene acrylic acid, and colorant.

15. The method of claim 8, wherein said heat is applied at a temperature of less than about 300 degrees F.

16. The method of claim 15, wherein said pressure is applied at less than about 10 psi.

17. The method of claim 8, wherein said graphics sheet is a hot stamping decorative foil.

* * * * *